July 17, 1928. Re. 17,034

L. BLOCH

FOUR-WAY DIVERTER VALVE

Original Filed May 27, 1925

INVENTOR.
Leon Bloch

BY
Fay, Oberlin & Fay
ATTORNEYS.

Reissued July 17, 1928. Re. 17,034

UNITED STATES PATENT OFFICE.

LEON BLOCH, OF CLEVELAND, OHIO, ASSIGNOR TO THE REPUBLIC BRASS COMPANY, OF CLEVELAND, OHIO, A CORPORATION OF OHIO.

FOUR-WAY DIVERTER VALVE.

Original No. 1,579,503, dated April 6, 1926, Serial No. 33,137, filed May 27, 1925. Application for reissue filed October 19, 1926. Serial No. 142,740.

This invention relates generally to plumbing fixtures and more particularly to a novel construction of valve used in connection with a bath tub and shower.

The object of the invention is to provide a valve which will serve as a diverter valve, that is to say a device that can be used in connection with inlet valves (not shown) to deliver to the tub or shower the water at any desired temperature, either all hot, all cold or mixed and modified.

Another object of the invention is to provide a valve of this character which will be of simple and economical construction and in which the parts can be readily replaced or repaired, if necessary.

With these objects in view and certain others which will become apparent as the description proceeds, the invention consists in the novel features of construction and in the manner of combining or arranging the same all of which will be fully described hereinafter and set forth in the appended claims.

Figure 1:
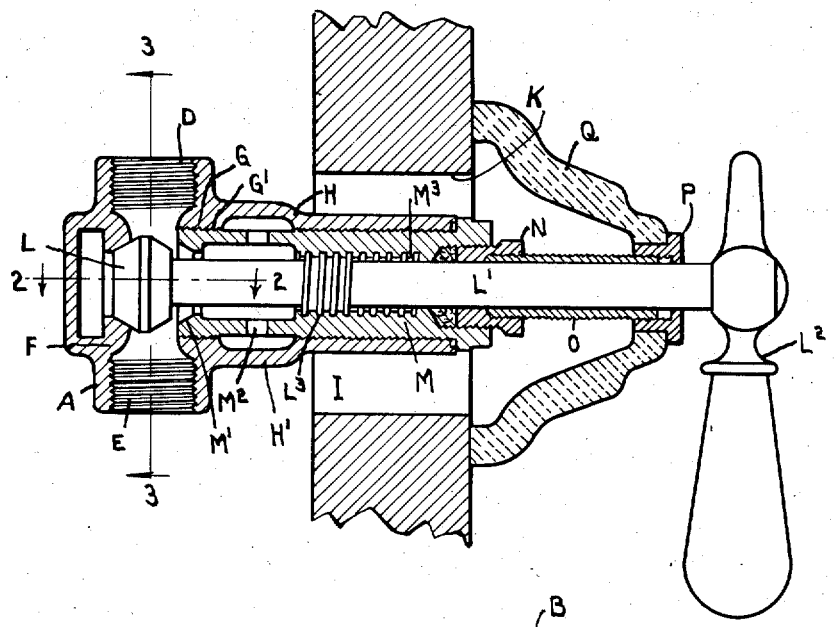
Figure 3:
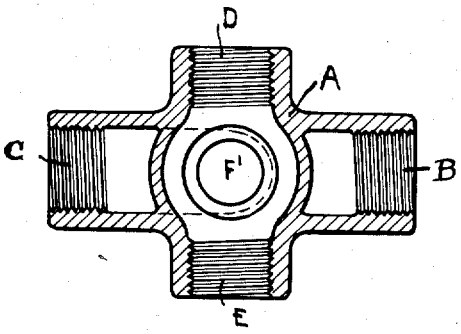
Figure 2:
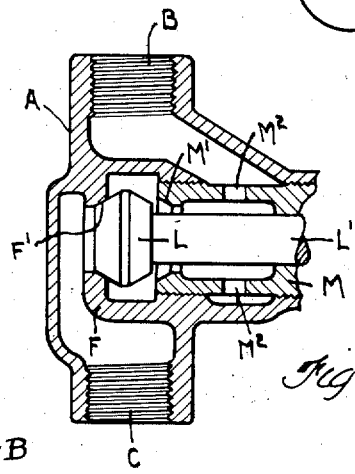

In the drawings forming a part of this specification, Fig. 1 is a sectional view of a valve constructed in accordance with my invention and illustrating the manner of arranging the same; Fig. 2 is a detail sectional view taken on the line 2—2 of Fig. 1 and looking in the direction of the arrows; and Fig. 3 is a detail sectional view taken on the line 3—3 of Fig. 1 and looking in the direction of the arrow.

In the practical embodiment of my invention I employ a valve casing A having an outlet B at one side and an outlet C at the opposite side, one of the outlets leading to a shower and the other outlet being adapted to be connected to a bath tub, an inlet D adapted to be attached to a hot water supply and an inlet E adapted to be attached to a cold water supply. The casing is divided into two compartments by means of partitions F and G and these partitions form in effect an inlet chamber into which the hot and cold water are delivered. The casing is also formed with a tubular extension or housing H which is adapted to extend into the opening I produced in the wall or tiling K.

The partition F has an opening F′, the edges of which are finished to provide a valve seat for the valve L carried at the end of the stem L′ and provided at its outer end with the operating handle $L^2$. The stem L′ of the valve is provided with threads $L^3$ which engage the threads $M^3$ of a sleeve M screwed into the housing H and into the threaded opening G′ produced in the partition G.

The tubular extension or housing H is slightly enlarged at H′ in order to provide an annular space between the inner end of the sleeve M and the lateral extension of the valve casing and the extreme inner end of the sleeve M is finished to provide the valve seat M′ upon which the valve L can seat when said valve is shifted from the position shown in Figs. 1 and 2.

The sleeve M is provided with ports $M^2$ which establish communication between the interior of the sleeve and the enlarged portion H′ of the housing, which housing communicates through the connection B with a shower outlet (not shown), it being understood that water from the inlets D and E passes through the opening in the valve seat M′ in the sleeve M, when the valve L is moved to the position shown in Figs. 1 and 2, and thence through the ports $M^2$ into the enlarged portion H′ of the housing and thence out the connection B.

The joint between the casing extension H and the sleeve M is suitably packed, and surrounding the stem L′ and screwing into the outer end of the sleeve M is a gland N. Screwing into this gland N is a sleeve O threaded externally to receive a cap P which is flanged for engagement with the porcelain escutcheon Q which surrounds and conceals the valve and also the opening in the wall or tiling in which said valve is arranged.

It will thus be seen that I provide a valve casing having inlets for the hot and cold water and outlets for the tub and shower and by moving the valve to seat in the opening in the partition F the outlet C will be cut off and the outlet B will be opened allowing the water to pass to the shower and by shifting the position of the valve the outlet B will be closed and the outlet C will be opened allowing the water to pass to the tub, it being understood of course that the supply of hot and cold water to the valve is controlled by separate valves in the hot and cold water pipes (not shown).

The valve is exceedingly simple consisting of the casing and lateral extension and sleeve arranged therein, one valve seat being carried at the inner end of the sleeve and the other valve seat in the partition in the casing.

By means of the packings arranged as described, all danger of leakage is avoided and the construction of the valve also lends itself to the employment of the concealing escutcheon which not only conceals the valve proper but also the opening in the wall or tiling in which the same is arranged.

It will thus be seen that I provide an exceedingly simple and economical form of a valve and particularly adapted for use in connection with tub and shower fixtures for providing the proper mixing of the hot and cold water.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a valve, the combination of a casing having two inlet and two outlet openings disposed in the same plane and said outlet openings being disposed on opposite sides of said casing, two spaced interior partitions in said casing defining a diverter chamber separated from said outlet openings but in communication with said inlet openings, said partition having aligned ports therein, and said casing having angular passages extending from said aligned ports to said outlet openings respectively, a hollow sleeve disposed in said casing and having a lateral port establishing communication between one of said angular passages and said diverter chamber, and a valve disposed between said aligned ports and movable into a position closing either thereof to divert the flow of liquid through the other of said ports.

2. In a valve, the combination of a casing having a lateral extension, said casing having two inlet and two outlet openings disposed in the same plane and said outlet openings being disposed on opposite sides of said casing, two spaced interior partitions in said casing defining a diverter chamber separated from said outlet openings but in communication with said inlet openings, said partitions having aligned ports therein, and said casing having angular passages extending from said aligned ports to said outlets respectively, a hollow sleeve disposed in the extension of said casing and having a portion spaced from the wall of said casing and provided with a lateral port establishing communication between one of said angular passages and said diverter chamber, and a valve disposed between said aligned ports and movable into a position closing either thereof to divert the flow of liquid through the other of said ports.

3. In a valve, the combination of a casing having two inlet and two outlet openings disposed in the same plane, the two outlet openings being disposed in opposite sides of said casing, two spaced interior partitions in said casing defining a diverter chamber separated from said outlet openings but in communication with said inlet openings, said partitions having aligned ports therein, and said casing having spaced substantially parallel angularly arranged passages extending from said aligned ports to said outlets respectively, a hollow sleeve disposed in said casing and having a lateral port establishing communication between one of said angular passages and said diverter chamber, and a valve disposed between said aligned ports and movable into a position closing either thereof to divert the flow of liquid through the other of said ports.

Signed by me, this 11th day of October, 1926.

LEON BLOCH.